O. KNOOP.
SCREW WRENCH.
APPLICATION FILED DEC. 4, 1912.
1,062,830.
Patented May 27, 1913.
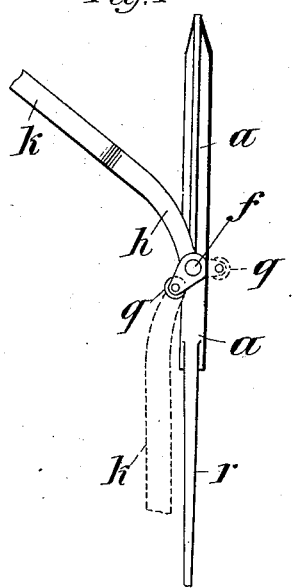
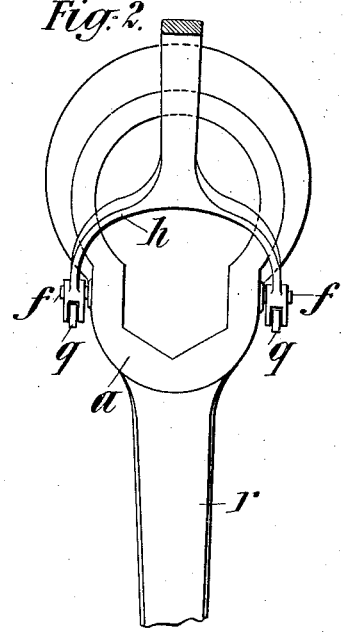
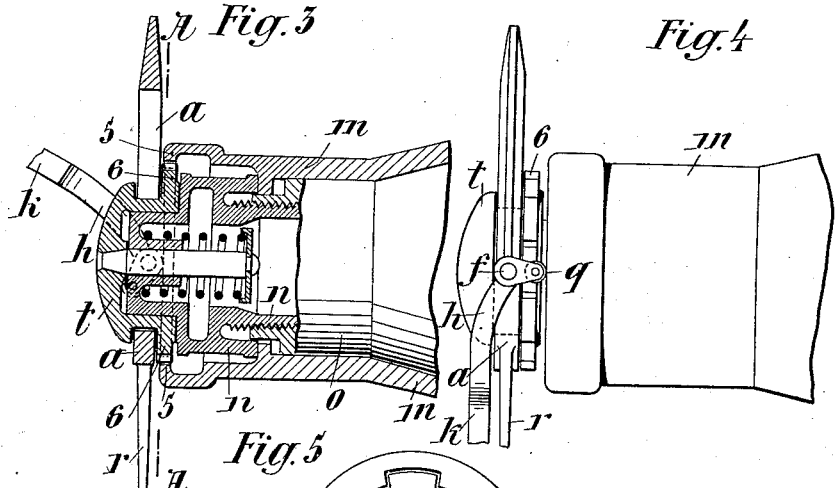
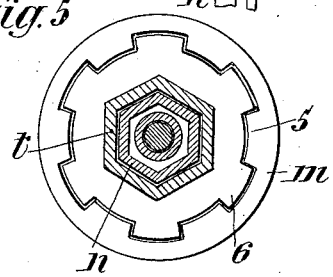
Witnesses.
G. M. Copenhaver,
G. Morris.
Inventor
Oskar Knoop
by F. Dittmar
Attorney

UNITED STATES PATENT OFFICE.

OSKAR KNOOP, OF EKKENBERG, NEAR GRATZ, AUSTRIA-HUNGARY.

SCREW-WRENCH.

1,062,830.  Specification of Letters Patent. Patented May 27, 1913.

Application filed December 4, 1912. Serial No. 734,954.

*To all whom it may concern:*

Be it known that I, OSKAR KNOOP, a subject of the Emperor of Germany, residing at Göstingerstrasse 40, Ekkenberg, near Gratz, Austria-Hungary, have invented certain new and useful Improvements in Screw-Wrenches, of which the following is a specification, reference being had therein to the accompanying drawing.

This invention relates to a new screw wrench.

In motor vehicles, wheel constructions are in use, in which the wheel hub and the axis box are secured together by the axle box cap, screwed in the latter, drawing the axle box into the wheel hub. In order to prevent the axle box cap from working loose, in these constructions devices have been applied which prevent the turning of the axle box cap; one of these devices consists of a square or hexagonal auxiliary cap arranged unrotatable but slidable on the axle box cap, which auxiliary cap is provided with a flange the projections of which are forced into openings in a corresponding flange, on the wheel hub, under the action of a suitably arranged extension or compression spring, so that the said auxiliary cap, under the influence of the spring, locks the axle box cap against working loose. In order to permit of turning the axle box cap, it is therefore necessary to draw the said auxiliary cap out of its locking position, against the pressure of the spring.

The subject of the present invention is a screw-wrench which is provided with arrangements by means of which, after placing the same in position, the said auxiliary cap can be drawn out of its locking position. And in order that my invention may be more fully understood I have caused to be appended hereunto one sheet of drawings marked with letters of reference indicating like parts in the various figures.

Figures 1 and 2 are respectively a side view and a front view of a screw wrench formed in accordance with one embodiment of my invention. Fig. 3 is a longitudinal section, and Fig. 4 an elevation of a wheel hub showing the application of the said embodiment. Fig. 5 is a detached cross-section on line A A of Fig. 3.

The screw wrench $a$, Figs. 1 and 2, to which the present invention is applied may be either of the open or closed type. A screw wrench of the closed type is shown in the illustrated embodiment, which has the advantage that the forcing open of the wrench, that is to say, the bending of the jaws of the wrench is prevented to a greater extent than is the case with an open wrench, which is of special importance for the good operation of the lifting device. At the outer sides of the keys and in a horizontal line with the center of the wrench opening, is pivoted a stirrup $h$ provided with a handle $k$. The prongs of the stirrup $h$ have at their inclined ends, which project at approximately right angles beyond the pivots $f, f$ small anti-friction rollers $q$. When the handle of the stirrup $h$ is in the position shown in dotted lines in Fig. 1 parallel to the screw key, the rollers move beyond the edges of the wrench and press the latter away from the surface upon which it rests.

The screw wrench shown in Figs. 1 and 2 is for the hereinbefore mentioned purpose of mounting and dismounting wheels in which (see Figs. 3, 4 and 5) the wheel hub $m$ is held on the axle box $o$ by a cap $n$ screwed into the latter, and the outer hexagonal end of the cap $n$ is provided with an externally hexagonal auxiliary cap $t$ for preventing the axle box cap $n$ from working loose, the cap $t$ engaging in an internal, toothed flange 5 on the wheel hub $m$ and being held in its engaged position by the action of a spring. The cap $t$ may be drawn out of its engaged position by a pull directed away from the wheel, whereupon the cap $t$ and with it the axle box cap $n$ can be rotated. This unlocking operation is performed by means of the screw wrench illustrated in Figs. 1 and 2 by sliding the screw wrench, as shown in Fig. 3 onto the hexagonal neck of the cap $t$ situated between the flange 6 and the flanged head; the handle $k$ of the stirrup $h$ which is pivoted to the screw wrench is thereupon turned into a parallel position to the handle $r$, whereby the rollers $q$ are caused to project beyond the edge of the screw wrench and press the screw wrench together with the cap $t$ engaged by the screw wrench, away from the wheel. The cap $t$ is thereby drawn out of its locking position, so that the same and the axle box cap $n$ embraced by the same can be rotated. When the screw wrench is removed, the cap $t$ automatically shoots back into its locking position.

Having now described my invention, what I claim is:

In a vehicle wrench a body provided with a handle, a stirrup pivoted by its ends on the outer sides of said body, a handle on said stirrup, arms fixed on the ends of the prongs of said handle and rollers pivoted on said arms.

In testimony whereof I affix my signature in the presence of two witnesses.

OSKAR KNOOP.

Witnesses:
 FRIEDRICH BINDER,
 AUGUST FUGGER.

Copies of this patent may be obtained for five cents each, by addressing the "Commissioner of Patents, Washington, D. C."